United States Patent
Seo et al.

(10) Patent No.: US 7,400,808 B2
(45) Date of Patent: Jul. 15, 2008

(54) OPTICAL FIBER, LIGHT AMPLIFIER, AND LIGHT SOURCE

(75) Inventors: Koji Seo, Tokyo (JP); Naoya Nishimura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/541,523

(22) PCT Filed: Jan. 13, 2004

(86) PCT No.: PCT/JP2004/000141

§ 371 (c)(1),
(2), (4) Date: Jun. 30, 2006

(87) PCT Pub. No.: WO2004/066007

PCT Pub. Date: Aug. 5, 2004

(65) Prior Publication Data

US 2006/0245708 A1    Nov. 2, 2006

Related U.S. Application Data

(60) Provisional application No. 60/439,405, filed on Jan. 10, 2003.

(51) Int. Cl.
*G02B 6/02* (2006.01)
(52) U.S. Cl. .......................................... 385/128; 385/48
(58) Field of Classification Search .................. None
See application file for complete search history.

(56) References Cited

U.S. PATENT DOCUMENTS 6,628,871 B2 * 9/2003 Maroney et al. ............ 385/123

FOREIGN PATENT DOCUMENTS

| JP | 62-49112 | 3/1987 |
|---|---|---|
| JP | 4-170508 | 6/1992 |
| JP | 4-301605 | 10/1992 |
| JP | 7-84159 | 3/1995 |
| JP | 9-506980 | 7/1997 |
| JP | 10-10353 | 1/1998 |
| JP | 10-510104 | 9/1998 |
| JP | 2000-9971 | 1/2000 |

* cited by examiner

*Primary Examiner*—Sung Pak
*Assistant Examiner*—Chad H Smith
(74) *Attorney, Agent, or Firm*—Knoble Yoshida & Dunleavy, LLC

(57) ABSTRACT

A coated optical fiber capable of transmitting high-power light, which is an optical fiber having an outer surface coated with a coating material, is characterized in that the coating material is made of a transparent UV curable resin so as to prevent the coating material from absorbing light leaked outside from the optical fiber to generate heat. Further, a light transmitting method is characterized in that a fiber fuse propagation threshold which is a minimal light output required for fiber fuse propagation is obtained and a transmitted light output is controlled so that the transmitted light output becomes smaller than the fiber fuse propagation threshold.

5 Claims, 12 Drawing Sheets

FIG. 3

Results after 5 min. exposure

| Input Power 1480nm | Bend Diameter (mm) | Fiber Coating | | | | | |
|---|---|---|---|---|---|---|---|
| | | UV (transparent) | UV (white) | UV (blue) | UV (green) | Nylon (white) |
| 1 W | φ 30 | No change | No change | No change | No change | No change |
| | φ 20 | No change | No change | No change | No change | No change |
| | φ 15 | No change | Deformed | Deformed | Deformed | Deformed |
| | φ 10 | No change | Deformed | Deformed | Deformed | Deformed |
| | φφ 5 | No change | Deformed | Deformed | Discolored | Melted |
| 2 W | φ 30 | No change | No change | No change | No change | No change |
| | φ 20 | No change | No change | No change | No change | No change |
| | φ 15 | No change | Deformed | Deformed | Deformed | Deformed |
| | φ 10 | No change | Deformed | Deformed | Deformed | Deformed |
| | φφ 5 | Discolored | Discolored | Discolored | Discolored | Combustion |
| 3 W | φ 30 | No change | No change | No change | No change | No change |
| | φ 20 | No change | Deformed | No change | No change | No change |
| | φ 15 | No change | Deformed | Deformed | Deformed | Deformed |
| | φ 10 | No change | Deformed | Deformed | Deformed | Deformed |
| | φφ 5 | Discolored | Discolored | Discolored | Discolored | Combustion |

FIG. 10

| Test | Condition | Connection Loss | Result : 5 samples evaluated at 1480nm Laser (2W) |
|---|---|---|---|
| 1 | Furukawa - Standard | 0.12dB (typ.) | No change : 5 |
| 2 | Scratch in whole surface | 0.18dB (typ.) | No change : 5 |
| 3 | 5μm scratch by file | 0.78dB (typ.) | Temperature increase : 5 |
| 4 | Ethanol | 0.14dB (typ.) | No change : 5 |
| 5 | Soil from hand | 0.21dB (typ.) | No change : 5 |
| 6 | Index matching oil + bubble | 0.64dB (typ.) | No change : 2, Temperature increase : 3 |
| 7 | Epoxy with black carbon | 0.67dB (typ.) | No change : 1, Temperature increase : 2, Endface damaged : 2 |
| 8 | Ni - plated | 1.39dB (typ.) | Temperature increase : 2, Endface damaged : 3 |
| 9 | Oil - based marker (black) | 0.24dB (typ.) | Endface damaged : 4, Fiber fuse : 1 |
| 10 | Phosphor bronze | 1.12dB (typ.) | No change : 1, Endface damaged : 3, Fiber fuse : 1 |

FIG. 12

Experiment result

| Input Power 1480nm | Diameter (mm) | Example 1 | | Example 2 | | Comparative Example 1 | |
|---|---|---|---|---|---|---|---|
| | | blue | green | blue | green | blue | green |
| 1 W | φ30 | ○ | ○ | ○ | ○ | ○ | ○ |
| | φ20 | ○ | ○ | ○ | ○ | ○ | ○ |
| | φ15 | ○ | ○ | ○ | ○ | × | × |
| | φ10 | × | × | ○ | ○ | × | × |
| 2 W | φ30 | ○ | ○ | ○ | ○ | ○ | ○ |
| | φ20 | ○ | ○ | ○ | ○ | ○ | ○ |
| | φ15 | ○ | ○ | ○ | ○ | × | × |
| | φ10 | × | × | ○ | ○ | × | × |
| 3 W | φ30 | ○ | ○ | ○ | ○ | ○ | ○ |
| | φ20 | ○ | ○ | ○ | ○ | ○ | × |
| | φ15 | ○ | ○ | ○ | ○ | × | × |
| | φ10 | × | × | ○ | ○ | × | × |

In the table
× : coating layer deformed (irreversible state)
○ : no change on coating layer Colored coated optical fiber Colored coated optical fiber Side view of coated optical fiber colored in stripes Side view of coated optical fiber colored in spiral stripes

OPTICAL FIBER, LIGHT AMPLIFIER, AND LIGHT SOURCE The present application is a continuation of International Patent Application PCT/JP2004/000141, filed on Jan. 13, 2004, designating the United States of America, which, in turn, claims the benefit of U.S. Provisional Patent Application No. 60/439,405, filed Jan. 10, 2003, under 35 U.S.C. §119(e).

BACKGROUND OF THE INVENTION

1. Field of the Invention

The present invention relates to an optical fiber, an optical amplifier including a Raman amplifier and a rare-earth doped fiber amplifier and a light source used in the optical communication system.

2. Description of the related art

Recently, in a field of optical communications, high-speed communication and WDM communication technique require large transmission capacity. Particularly, in the WDM communication technique, the need for a broadband optical amplifier is increased which allows batch amplification of wideband signal light. The broadband optical amplifier which meets the demand includes a Raman amplifier and a rare earth doped fiber amplifier. The Raman amplifier is configured to utilize a stimulated Raman scattering effect so as to amplify signal light. In order to cause the stimulated Raman scattering effect of the Raman amplifier efficiently, high-power pumping light is required.

In addition, in order to amplify broad band signal light, it is general to use pumping light which is obtained by multiplexing laser light of plurality of wavelengths. This sometimes makes the multiplexed pumping light output from the optical amplifier become high-power light. To provide for a broader communication band in the future, an optical amplifier capable of batch amplification over abroad spectrum is required. In order to satisfy this need, further higher power pumping light is required. In other words, pumping light of higher power is output from the optical amplifier. Here, it is also a significant purpose to design this optical amplifier so as to have a flat gain over the spectrum of amplified signal light.

The description up to now is made about the Raman amplifier. However, the above description holds true for transmitted signal light and a rare-earth doped fiber amplifier such as an EDFA. That is, light of high power is propagated. For example, even signal light of weak power is wavelength-division-multiplexed by a multiplexer such as an AWG, the signal light may become high-power light. Further, a laser element used in combination with an EDFA may output high power.

Under high-power transmission light conditions, there are more problems caused. The first problem is that of burnout of a coating material of the optical fiber. In the optical transmission system, the optical power becomes higher and higher, while for the purpose of miniaturizing an optical amplifier and a light source, the need to implement optical components at high densities has intensified. In order to realize this, it becomes necessary to bent the optical fiber with a small bending diameter in consideration of downsizing of the optical amplifier and the light source. In short, high power light should be transmit with an optical fiber housed in compact for implementation of high densities and downsizing of an optical device.

However, when an optical fiber is bent with a small bending diameter, light transmitted is leaked from the core, through the clad, coating materials to the outside of the optical fiber. Then, as described above, as the power of propagated light becomes higher, there may occur a problem that has not occurred for the conventional light intensity.

For example, when a coating material coating on the outer surface of an optical fiber absorbs light of high power leaked from the core, the optical fiber generates heat. For this reason, a portion of small bending diameter of the optical fiber is used at high temperatures. This may result in earlier deterioration of the coating material than that used in the conventional way and easy breakage of the optical fiber.

Accordingly, one object of the present invention is to solve the above-mentioned problem and to allow propagation of high-power light in an optical fiber even if the optical fiber is bent with a small bending diameter without presenting a problem such that a coating material is deteriorated due to optical power leaked out from the core of the optical fiber via the clad and the coating material.

The second problem associated with high output of optical power regards fiber fuse.

When the optical energy density in an optical fiber of transmission path is higher than a threshold, in other words in a state of high optical energy density, and various factors are added to induce core melting such as heating, a center portion of the optical fiber is first melted locally. Then, this fusion is self-propagated toward the light source. This is what is called a fiber fuse phenomenon.

In this case, the optical fiber fusing phenomenon is known to occur in a cross sectional area which is almost equal to the core diameter (approximately 10 μm) in the case of SMF (Single Mode Fiber).

This fiber fuse phenomenon propagates approximately at the speed of 1 m/s and continues as long as light transmission from an optical amplifier or light source is shut down or optical energy density becomes lower than a certain threshold. After propagation of a melted portion, propagation traces (voids) are formed in the core of the optical fiber where light cannot be transmitted.

Fiber fuse is a phenomenon that is likely to occur when high-power light is transmitted with the optical energy density being more than a certain threshold or when the fiber is heated locally. Accordingly, fiber fuse does not necessarily occur even when an area around the core is heated locally. Besides, fiber fuse occurs only when a particular condition is met, and the possibility of occurrence of fiber fuse is extremely low.

However, once fiber fuse occurs, the fiber fuse propagates toward an optical amplifier or light source, which may break a part of the optical fiber or the whole length of the optical fiber. Further, when fiber fuse reaches an optical component or an optical device connected to the optical fiber, the optical component or optical device may be also broken, and the optical transmission path may be also broken.

For this reason, another object of the present invention is to solve the above-mentioned conventional problem and to provide an optical signal transmitting method and controlling method which allows transmission of a high-power optical signal without allowing fiber fuse to occur or propagate in an optical fiber.

BRIEF SUMMARY OF THE INVENTION

In order to solve the above-mentioned problem the inventors of the present invention insistently studied. As a result of this study, the inventors have found an optical fiber which is not damaged even if the optical fiber is bent with a small bending diameter by using a coating material that hardly absorbs leaked light, thereby allowing stable propagation of high-power light.

In this embodiment, since a transparent UV curable resin is used as a coating material, even if the optical fiber is bent with a diameter of about 10 mm at the minimum, it is possible to prevent deterioration of the coating material of the optical fiber due to absorption of leaked light and also prevent breakage of the optical fiber.

Further, the inventors have found as another embodiment of an optical fiber of the present invention an optical fiber of which a coating layer is structured by a primary coating layer, a secondary coating layer and a colored layer all made of a UV curable resin, the colored layer intermittently coating the secondary coating layer. Furthermore, the inventors have found an optical fiber of which a colored layer is formed in stripes with a secondary coating layer partially uncoated with the colored layer, or an optical fiber of which a colored layer is formed in spiral stripes with a secondary coating layer partially uncoated with the colored layer.

The inventors have also found an optical device (e.g. optical amplifier, light source) using the above-described optical fiber and an optical fiber cable which is connected to an optical device by use of the above-described optical fiber.

Breakage of an optical fiber due to deterioration of fiber coating or ignition of a coating layer, which are problems of the conventional art, are considered to occur by optical energy of light which is, when an optical fiber coated with primary and secondary coating layers of UV curable resin is further coated with a colored layer, leaked through a glass clad layer to the coating layers, not allowed to pass through the colored layer, reflected and absorbed within the coating layers and generates heat.

Accordingly, with the above-described embodiments, a part of the colored layer over the secondary coating layer is removed and the leaked light is lead into the outside of the coated optical fiber, which makes it possible to provide a highly-reliable transmission system without causing any problem even if the bending diameter becomes small in a coated optical fiber for guiding high-power light of 500 W or more.

Further, the inventors of the present invention have found the minimal light power $P_{th}$ (W) required for causing fiber fuse propagation (fiber fuse threshold) from various analysis and experiments. They have also found a relationship between this minimal light power $P_{th}$ and a light source wavelength (spectrum), an optical fiber type, a dopant type and an MFD (Mode Field Diameter).

This minimal light power $P_{th}$ can be used to control power P (W) of propagated light. In other words, if light is propagated within the bounds of satisfying a relation:

$$P < P_{th}$$

there occurs no fiber fuse, and even if there occurs a fiber fuse for some reason, there is no possibility that the fiber fuse propagates toward an optical amplifier and a light source, thereby allowing propagation of high-power light.

BRIEF DESCRIPTION OF THE DRAWINGS

FIG. 3 is a table showing test results of the bend test of the optical fiber according to the present invention and the conventional optical fiber;

FIG. 10 is a table showing results of damage tests of an optical fiber end face;

FIG. 12 is a view showing experimental results of insertion test performed for five minutes in high-power transmission experiment;

DETAILED DESCRIPTION OF THE INVENTION

With reference to the drawings embodiments of the present invention will be described in detail below.

(Optical Fiber with a Coating Material that is not Burned Out)

First description is made about an embodiment of an optical fiber which is able to transmit pumping light or a high-power optical signal without deterioration, damages or the like caused thereon even if the optical fiber is bent with a small bending diameter.

(Optical Fiber Using Transparent Ultraviolet Curable Resin)

A conventional optical fiber is coated with a coating material including an ultraviolet curable resin composition based on urethane acrylate, Epoxy acrylate and silicon (hereinafter referred to as "UV curable resin) and a nylon resin, and for the purpose of identification of the optical fiber, the coating material is colored. Accordingly, when the optical fiber is bent with a small bending diameter, the coating material absorbs light power, which is likely to leak out from the core and clad of the optical fiber, and generates heat. Conventionally, propagated light power was small and heat generated is not as much as heat that causes any problem. However, in future, there is a possibility that due to high-power propagating signal light or pumping light, a colored coating material may absorb power of light leaked from the transmitted signal light and generate heat, and the heat causes damages to the coating material, which results in breaking of the optical fiber.

On the other hand, according to the present invention, a material used in coating an optical fiber is a transparent UV curable resin. With use of this transparent UV curable resin, even if, when high-power light is propagated, the optical fiber is bent with a small bending diameter and this bending causes light leakage, it becomes possible to reduce a large amount of optical power that is absorbed by the coating material. Accordingly, this coating material can be prevented from being damaged by heat generation, and high-power light can continue to be propagated.

Here, in order to check into the performance of an optical fiber according to the present invention, an experiment of high-power light propagation is conducted on a conventional optical fiber and an optical fiber according to the present invention in a condition that the optical fibers are bent with any bending diameter.

Figure 1:
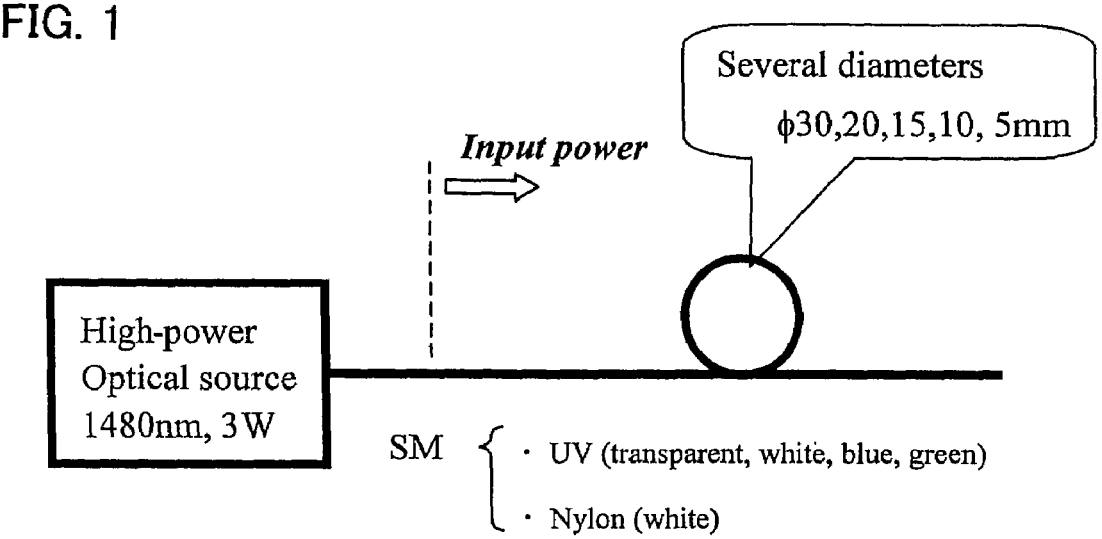
FIG. 1 is a schematic view showing a bend test device of an optical fiber according to the present invention and a conventional optical fiber.

FIG. 1 schematically shows a device for bending experiment conducted on the optical fiber according to the present invention and the conventional optical fiber. The optical fiber according to the present invention used for experiment is an optical fiber coated with a transparent UV curable resin, while the conventional optical fiber used for experiment includes an optical fiber coated with a white UV curable resin, an optical fiber coated with a blue UV curable resin, an optical fiber coated with a green UV curable resin and an optical fiber coated with white nylon.

Generally speaking, an optical fiber coated with a UV curable resin is used within an optical device and an optical fiber coated with nylon is often used as an optical fiber which connects optical devices. Regarding the outer diameter of an optical fiber, the outer diameter of an optical fiber coated with UV curable resin is 250 μm and the outer diameter of an optical fiber coated with nylon is 900 μm.

In the experiment, after laser light source is connected to each of the experimental optical fibers, a bent portion of one turn is formed at a part of the optical fiber. Then, the intensity of input light and the bending diameter are changed to observe deterioration of the coating material of each of the optical fibers due to leakage of light.

Also in the experiment, the output P (unit: W) of laser light source at 1480 nm wavelength is varied at three stages: 1 W, 2 W and 3 W. In addition, deterioration of coating material is observed for each of the laser light outputs, with the bending diameter A (unit: mm) of an optical fiber varied at five stages: 30 mm, 20 mm, 15 mm, 10 mm and 5 mm.

Figure 2:
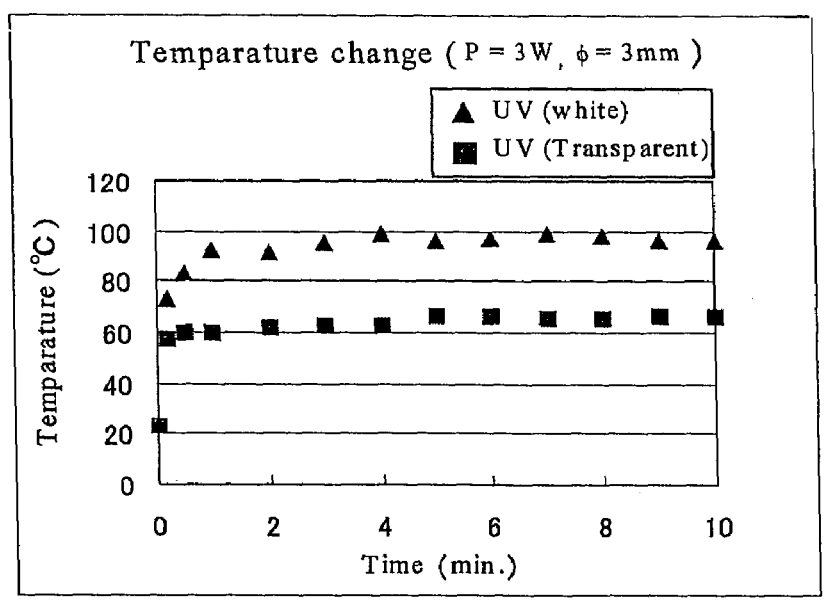
FIG. 2 is a graph showing temperature variation of an outer surface in bend test of an optical fiber according to the present invention and a conventional optical fiber.

At the same time, temperature variation of an optical fiber outer surface is measured by a thermocouple. Measurement of temperature variation is conducted under the severest condition that the output P of the laser light source is set at the maximum of 3 W and the bending diameter A of each optical fiber is set at 3 mm. FIG. 2 shows results of temperature measurement. What was measured is the optical fiber coated with a transparent UV curable resin of the present invention and the conventional optical fiber coated with a white UV curable resin. Here, the vertical axis of the graph indicates the temperature (unit: degree C) and the horizontal axis indicates the time (unit: minute).

In the both optical fibers, the temperature rapidly rises about one minute after allowing light to pass. About two or three minutes after, heat generated by leaked light and heat released from the outer surface are balanced and the temperature shows a state of equilibrium. In the conventional optical fiber coated with a white UV curable resin the surface temperature reaches around 100 degree C. while in the optical fiber coated with a transparent UV curable resin of the present invention the surface temperature falls to between 60 degree and 65 degree C. In consideration of heat-resistant temperature of the coated material, this temperature difference is very influential.

In addition, based on this temperature increase data, if high-power light is propagated for five minutes, a state of equilibrium is already obtained, and damages due to temperature change of coating material are enough to be clarified. Accordingly, in the following experiment for comparing optical fibers, damages added after high-power light is propagated for five minutes are observed.

FIG. 3 is a table for showing comparison results of an optical fiber (UV (transparent)) of the present invention and four conventional optical fibers (UV (white), UV(blue), UV(green), Nylon(white)). Each of the fibers was observed for each of the intensities of input light of 1 W, 2 W, 3 W, and for each of the bending diameters A of 30 mm, 20 mm, 15 mm, 10 mm, 5 mm.

When the intensity P of input light was 1 W, the optical fiber coated with the transparent UV curable resin of the present invention was not damaged at all for all bending diameters.

On the other hand, regarding the three optical fibers coated with respective colored UV curable resins, when the bending diameter fell to 15 mm and below, the optical fibers was damaged as the coating material absorbed leaked light and the optical fibers are deformed.

In the case of the optical fiber coated with nylon, as the bending diameter fell to 15 mm and below, the coating material absorbed leaked light and was damaged and accordingly the optical fiber was deformed. When the bending diameter further fell to and 5 mm below, the coating material melted to expose the optical fiber.

When the intensity P of input light was 2 W, in the case of the optical fiber coated with the transparent UV curable resin of the present invention, the fiber coating was not damaged at all for the bending diameter of 10 mm or more. When the bending diameter fell to 5 mm and below, the coating material was discolored into dull color.

In the case of the three optical fibers coated with respective colored UV curable resins, when the bending diameter fell 15 mm and below, the coating material absorbed leaked light and was damaged, and the optical fiber was deformed. When the bending diameter further fell to 5 mm or less, the three colored fiber coatings became dull.

In the case of the optical fiber coated with nylon, as the bending diameter fell to 15 mm or less, the coating material absorbed leaked light and was damaged and accordingly the optical fiber was deformed. When the bending diameter falls to 5 mm or less, the coating material was broken.

When the intensity P of input light was 3 W, in the case of the optical fiber coated with the transparent UV curable resin of the present invention, the fiber coating was not damaged at all if the bending diameter was 10 mm or more. When the bending diameter fell to 5 mm and below, the coating material was discolored into dull color.

Regarding the optical fibers coated with colored UV curable resins, in the case of the white and blue optical fibers, when the bending diameter fell 15 mm and below, the coating material absorbed leaked light and was damaged, and the optical fiber was deformed. In the green optical fiber, when the bending diameter fell 20 mm and below, the coating material absorbed leaked light and was damaged, and the optical fiber was deformed. When the bending diameter further fell to 5 mm or less, the three colored fiber coatings became dull.

In the case of the optical fiber coated with nylon, as the bending diameter fell to 15 mm or less, the coating material absorbed leaked light and was damaged and accordingly the optical fiber was deformed. When the bending diameter falls to 5 mm or less, the coating material was broken.

From the results described up to this point, in the case of the optical fiber coated with the transparent UV curable resin of the present invention, when the bending diameter was 10 mm or more, the fiber coating was not damaged at all and high power light of up to 3 W could be transmitted.

On the other hand, in the case of the optical fiber with the colored UV curable resins, when the bending diameter fell down 15 mm or less the coating materials were damaged even for the bending diameter of 15 mm or less, and it was determined that the optical fiber did not come into practical use. The difference in color did not lead to clear difference in damages.

Further, among the same conventional optical fiber, the optical fiber coated with nylon was heavily damaged. When the bending diameter was 5 mm or less, there occurred melting and breakage of the fiber coating.

Form this experiment, it was proved that the optical fiber of the present invention had more excellent performance than the conventional optical fiber in terms of endurance of the optical fibers due to leaked light induced by bending.

(Optical Fiber with Semitransparent UV Curable Resin)

In addition, in the above-described experiment the optical fiber coated with a transparent UV curable resin was used. However, it is determined that when an optical fiber coated with a semitransparent UV curable resin is used instead, the optical fiber presents excellent damage-resistant performance that is quasi equal to that of the optical fiber coated with a transparent UV curable resin and significantly different that of the optical fiber coated with a colored UV curable resin.

Further, when the above-mentioned optical fiber with a transparent UV curable resin is arranged bent in an optical device, a functional component for absorbing leaked light may be arranged outside the optical fiber. For example, when the optical fiber is arranged in the optical device while wound around a bobbin or the like, a package member for absorbing light may be arranged so that the package member may cover the outside of the bobbin. In this case, the package member may be provided with a film for absorbing light at the inner surface of the package member. Thus, if the optical fiber with a transparent UV curable resin is housed in the package member, light leaked to the outside of the optical fiber is absorbed by the package member, and accordingly, the leaked light does not adversely affect the optical amplifier and the light source If necessary, the package member may be provided with a temperature adjusting function.

(Optical Fiber with an Intermittent Colored Layer)

Next description is made about an optical fiber with an intermittent colored layer of which the secondary coating layer is not completely covered with a colored layer.

Tight bending of optical fibers is not conductive to long time reliability, however in actual setup of systems fibers maybe tightly bent in short time. When tightly bent the light is radiated from the core to the fiber coating, which is heated particularly under high power conditions, sometimes inducing deterioration of the coating layer. The inventors of the present application have investigated damage to the fiber coating induced by tight bending under high power conditions in the short term.

An optical fiber used in the experiment of the present invention is a single mode fiber based on ITU-TG.625 and the coating layer of the optical fiber is composed of a primary coating layer and a secondary coating layer made of UV curable resin.

In general, the primary coating layer is made of a soft resin having a Young's modulus of 0.5 through 10 MPa in order to prevent influence by external pressure from being propagated and the secondary coating layer is made of a hard resin having a Young's modulus of 100 through 1000 MPa for the purpose of protection. As another characteristic, Tg (glass transition temperature) of the primary coating layer material is −20 through 10 degree C. and that of the secondary coating material is 60 through 120 degree C. The refractive indexes of the coating layers are preferably arranged so that the refractive index becomes higher toward the outside, that is, in the order of the glass clad, the primary coating layer and the secondary coating layer.

A UV curable resin used in the present invention is a polyurethane acrylate based UV curable resin having a thickness of 200 μm. According sheet evaluation with UV radiation amount of 500 mJ/cm² under air, the primary coating layer has Young's modulus of 1.0 MPa, Tg −5 degree C. and the refractive index of 1.49 and the secondary coating layer has Young's modulus of 800 MPa, Tg 90 degree C. and the refractive index of 1.53.

The optical fiber used in the present invention is a single mode fiber having a glass diameter of 125 μm, of which the primary coating layer has a diameter of 195 μm and the secondary coating layer has a diameter of 245 μm.

On the other hand, a colored layer is formed by adding various pigment or colorant to uncured UV cured resin liquid, applying the liquid onto the coated fiber while the pigment or colorant is spread evenly in the liquid and curing the resin by UV radiation. At this time, the more the pigment or colorant is added, the more highly colored the colored layer become which facilitates identification of the optical fiber. However, as the added pigment or colorant is more added, UV light is hard to pass through thereby reducing curability of the colored resin itself.

Regarding the transmittance of the colored layer, a colored UV curable resin film having the same thickness as that of the colored layer can be formed by a spin coater and measured with use of an ultraviolet spectrometer. Then, the transmittance can be obtained by the percentage of the intensity of light which is allowed to pass through the film I2 out of the intensity of incident light to the film I1 (I2/I1×100).

Generally, the colored layer is formed by a thin layer having a thickness of 3 through 10 μm. The photoinitiator used in the colored UV curable resin is a compound based on diphenyl ketone or amino ketone having an absorption wavelength of 330 through 420 nm. Usually used in this region is a colored resin having a thickness of 10 μm and a transmittance of 5% or more.

Here, the colored UV curable resin used in the present invention is a clear resin to which no pigment is applied, which has a thickness of 40 μm and, according to sheet evaluation at the UV radiation of 500 mJ/cm2 under air, a Young's modulus of 1100 MPa and Tg 100 degree C. The colors of the colored resins used in the experiment are blue and green and both of the colored resins have a transmittance of 5% or more.

The color-coated optical fiber which constitutes the present invention is, according to the examples and comparative example, structured by applying a colored layer having a thickness of 5 μm to around the above-described optical fiber.

Here, the colored layer of the color-coated optical fiber of the present invention preferably makes up 30 through 80% of the superficial area of the optical fiber, and particularly 40 through 70%. When the colored layer makes up less than 30%, identification of the colored layer becomes difficult and when the colored layer makes up more than 80%, the colored layer is deformed due to leaked light.

EXAMPLE 1

Figure 13:
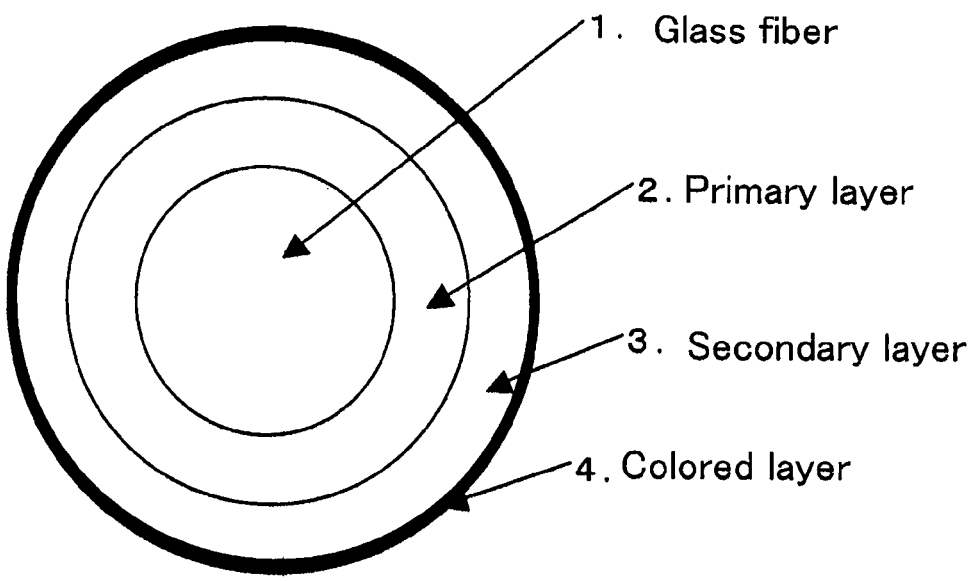
FIG. 13 is a cross sectional view showing a conventional optical fiber fully coated with a colored layer.
Figure 14:
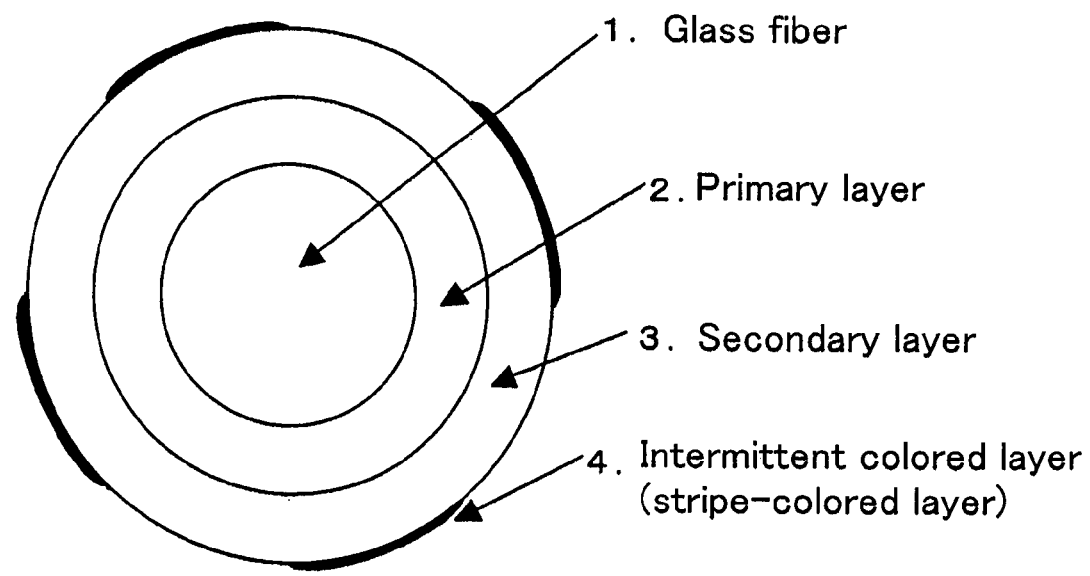
FIG. 14 is a cross sectional view showing an optical fiber having an intermittent colored layer according to the present invention.
Figure 15:
FIG. 15 is a side view showing an optical fiber having a layer colored in stripes.

Color is applied in strips at three points on the outer surface of the optical fiber in such a manner that the colored layer makes up approximately 50% of the outer surface area of the optical fiber and the colored layer portion alternates with the non-colored layer portion. Then, this color coated optical fiber is used as an example 1 (see FIGS. 14 and 15). For comparison, a cross section of a conventional optical fiber completely coated with a colored layer is shown in FIG. 13.

EXAMPLE 2

Figure 16:
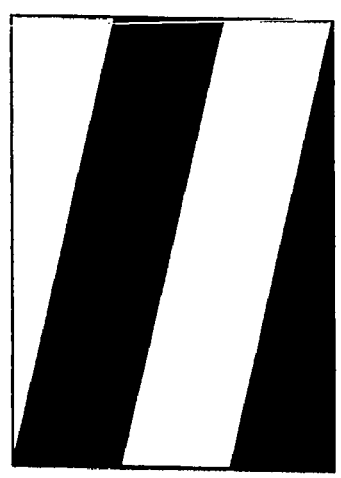
FIG. 16 is a side view showing an optical fiber having a layer colored in spiral stripes.

Color is applied in strips at three points on the outer surface of the optical fiber in such a manner that the colored layer makes up approximately 50% of the superficial area of the optical fiber and the colored layer portion alternates with the non-colored layer portion. Here, in order that the stripes become spiral, the optical fiber is twisted when being colored (see FIG. 16). The way of twisting is the same as the method of twisting used in drawing in an optical fiber for improvement of PMD characteristic, that is, the optical fiber is twisted at a position after passing through a UV lamp so that the optical fiber is colored in spiral strips.

COMPARATIVE EXAMPLE 1

Color is evenly applied onto the outer surface of the optical fiber to be used as a comparative example 1.

(Experiment)

Figure 11:
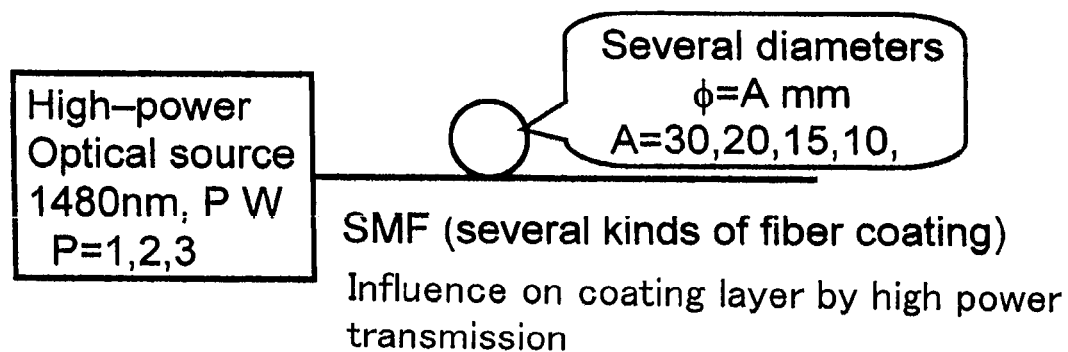
FIG. 11 is a view showing influence on a coating layer due to high-power transmission.

FIG. 11 shows an experimental device to obtain influence on a coating layer by high power transmission. An output from a laser light source is P [W] and bending diameter is A [mm]. The used light source outputs 3 W at maximum at a center wavelength of 1480 nm.

This high power experimental system is used to carry out connection test for 5 minutes on the examples and comparative example. The experimental results after 5 minutes are shown in FIG. 12. When the diameter is 30 mm or more, no problem is shown in the examples and comparative examples. When the diameter is 20 mm or less, an outstanding effect is observed in the example.

In the comparative example 1, in the case of the diameter: 20 mm and 3 W, deformation of the UV coating layer of the green coated optical fiber (the coating layer is deformed and cannot return to its former state) is observed. In the case of the diameter: 10, 15 mm and 2 W, the UV coating layers of both of the blue coated optical fiber and green coated optical fiber are deformed.

In the example 1, no change is observed when the diameter is 15 mm more. However, in the case of the diameter: 10 mm, the UV coating layers of both of the blue coated optical fiber and green coated optical fiber are deformed.

In the example 2, no change is observed on every condition. Since strip coloring is formed spirally, intermittent coloring is made flat over the radial direction and the longitudinal direction of the optical fiber surface, which prevents the coating layer from being deformed.

During high power transmission as described above, even if an optical fiber is suddenly bent due to handling or the like to leak transmitted light, as the colored layer is formed in stripes, leaked light is allowed to pass to the outside of the coating layer, thereby suppressing deterioration of the fiber coating and preventing a problem such as fiber breakage or ignition completely.

(Optical Transmission Method with No Fiber Fuse Induced)

Next description is made about an embodiment of a transmitting method for propagating high-power light stably with no fiber fuse occurring or propagating.

In consideration of recent high optical power, the fiber fuse phenomenon can occur easily by absorption of optical power due to contaminations such as dust attached to a connection end face of a connector embedded in the optical transmission system, by absorption of optical power based on an structural error in the optical fiber, a dielectric multilayer film filter or by concentration of optical energy density due to multiple reflection based on bending or breakage of an optical fiber.

Accordingly, as further high-power optical power in future is assumed, it becomes necessary to prevent a fiber fuse from occurring and, if the fiber fuse occurs, from propagating to an optical amplifier or a light source. In other words, it is quite necessary to take measures to prevent occurrence and propagation of a fiber fuse and breakage of an expensive optical amplifier, a light source and an optical device.

As represented by pumping light used in the Raman amplifier, propagated signal light and pumping light become high power light, which intensifies the possibility to cause a fiber fuse. This embodiment approaches to obtain a relationship between the minimal power required for fiber fuse propagation (fiber fuse propagation threshold $P_{th}$) and a light source wavelength, optical fiber type, dopant and MFD. That is, when the power of propagated light is P, it is possible to prevent occurrence or propagation of a fiber fuse if light is propagated within the bounds of satisfying a relation:

$P<P_{th}$.

Figure 4:
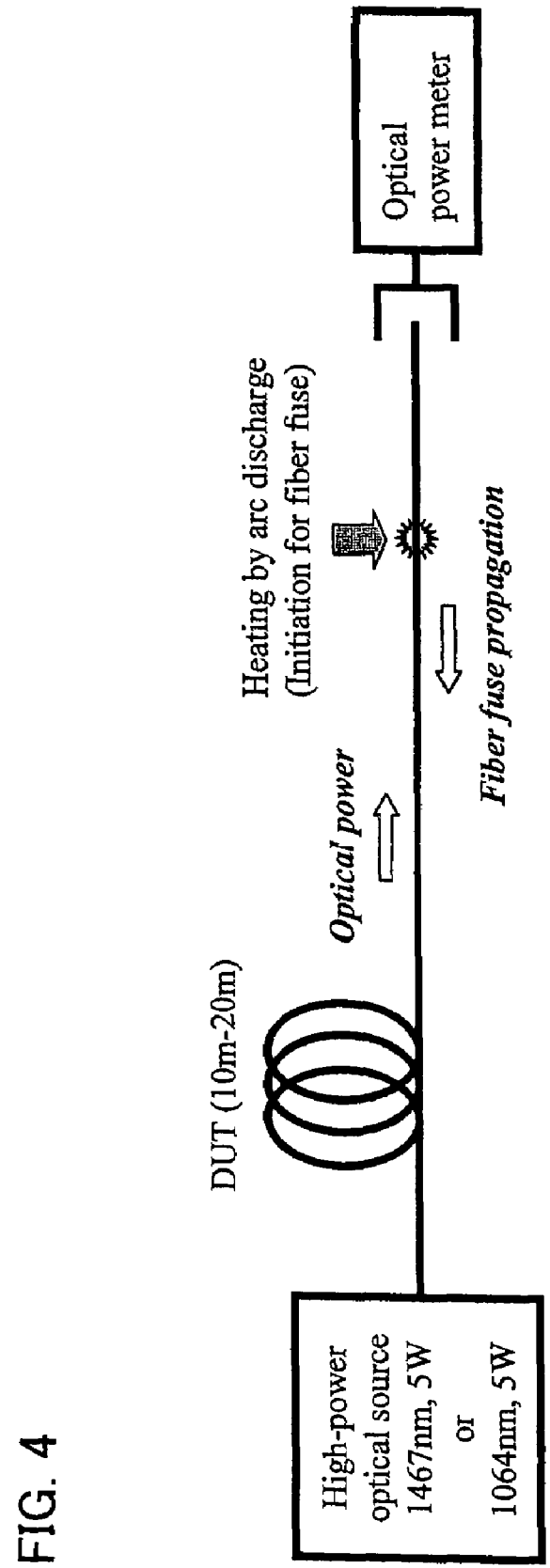
FIG. 4 is a schematic view showing a measuring device for measuring a fiber fuse propagation threshold $P_{th}$ (W)

FIG. 4 schematically shows a measuring device for measuring such a fiber fuse propagation threshold $P_{th}$. An optical fiber to be measured is connected to light source which generates 5 W power at the maximum at a wavelength of 1064 nm or 1467 nm. Then, the power of input light is increased and the optical fiber is locally heated thereby to cause a fiber fuse at a heated portion. Then, the power of the light source is lowered so as not to cause the fiber fuse, and the optical power at this point is set as a fiber fuse propagation threshold $P_{th}$. Hence, this value is extremely reliable and it can be said that there occurs no fiber fuse by optical power of this value or less.

Figure 5:
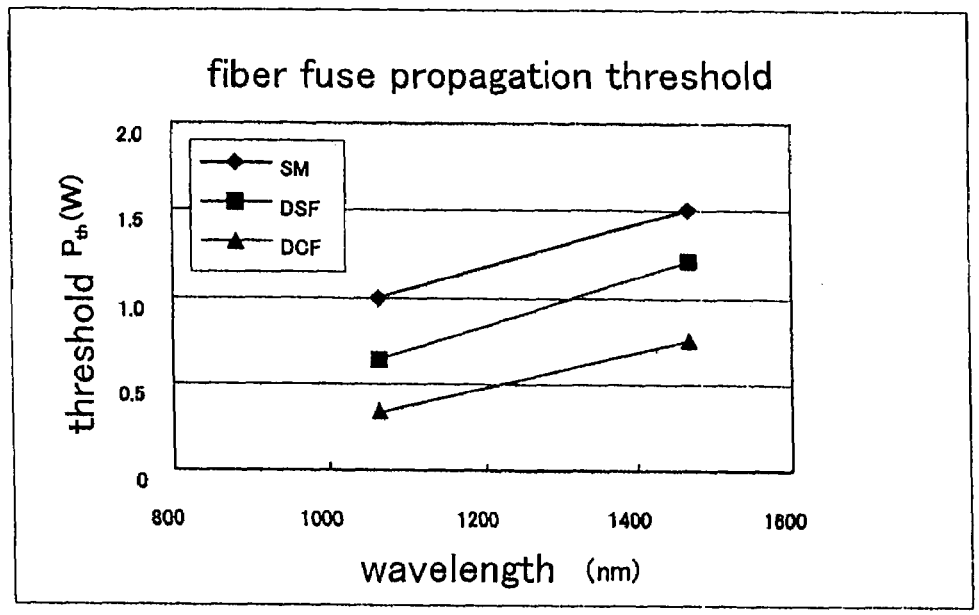
FIG. 5 is a graph showing measurement results of a fiber fuse propagation threshold $P_{th}$ (W) of SMF, DSF and DCF.

FIG. 5 shows results of fiber fuse propagation threshold $P_{th}$ (W) measurement at wavelengths of 1064 nm, 1467 nm regarding an SMF (single mode fiber), a DSF (dispersion shifted fiber), and a DCF (dispersion compensation fiber). The vertical axis indicates a threshold (unit: W) and the horizontal axis indicates a wavelength (unit: nm)

The wavelength and the fiber fuse threshold are considered to have a relationship of direct function or a relationship approximate thereto. This relationship between the wavelength and the fiber fuse threshold depends on an optical fiber type, which is shown in FIG. 5. Here, an MFD (mode field diameter) of the SMF is around 10 μm, an MFD of the DSF is around 7-8 μm, and an NFD of the DCF is around 4-5 μm. That is, the MFD decreases in the order of SMD, DSF and DCF. Also seen from FIG. 5, the fiber fuse propagation threshold $P_{th}$ decreases in the order of SMD, DSF and DCF.

Figure 6:
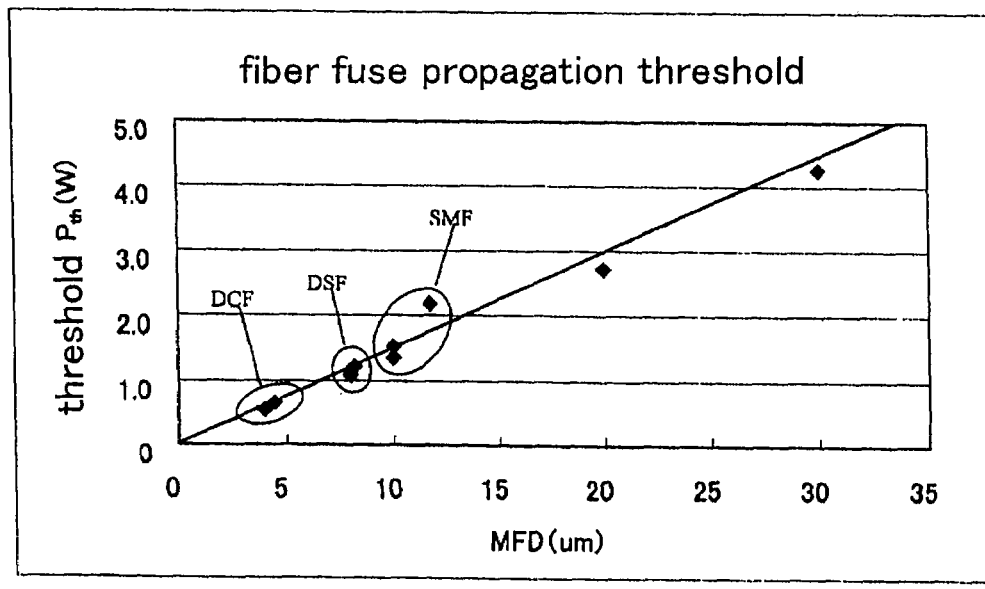
FIG. 6 is a graph showing a relationship between a fiber fuse propagation threshold $P_{th}$ (W) and MFD.

Next, a relationship between the fiber fuse propagation threshold $P_{th}$ and the MFD is shown in FIG. 6. Data measurement was carried out by use of an SMF, a DSF, a DCF and another fiber of high MFD. Here, the fiber of high MFD includes, for example, a thermally-diffused expanded core fiber (hereinafter referred to as "TEC fiber"). The TEC fiber is an optical fiber of which an optical fiber MFD (mode field diameter) is locally augmented by the thermal diffusion technique. Here, the vertical axis of the graph indicates a threshold (unit: W), and the horizontal axis indicates an MFD (unit: μm). As is not shown in the graph, according to the experimental results, what wields the largest influence over the fiber fuse propagation threshold $P_{th}$ is MFD. Other factors that wield influence over the fiber fuse propagation threshold $P_{th}$ are a kind and an amount of dopant.

As is shown in FIG. 6, there has not existed measured data of fiber fuse propagation threshold $P_{th}$ in the wide MFD region from zero to the neighborhood of 30 μm. Judging from the measured data of fiber fuse propagation threshold $P_{th}$ in the narrow MFD region of 10 μm or less, fiber fuse propagation threshold $P_{th}$ and MFD have a correlation approximate to the quadratic function. However, as shown in FIG. 6, it becomes clear from measurement results of MFD 20 μm or 30 μm that they have a relationship of direct function: $P_{th}$=0.15× MFD of the optical fiber (μm) or its approximate correlation.

Using data in FIGS. 5 and 6, it is possible to obtain a predetermined fiber fuse propagation threshold based on the type of the optical fiber, specification thereof, and the wavelength of signal light to be propagated and pumping light.

Next description is made about an optical amplifier which is controlled so as to satisfy a relationship of $P<P_{th}$ between the fiber fuse propagation threshold $P_{th}$ and the power of light to be propagated P.

Figure 7:
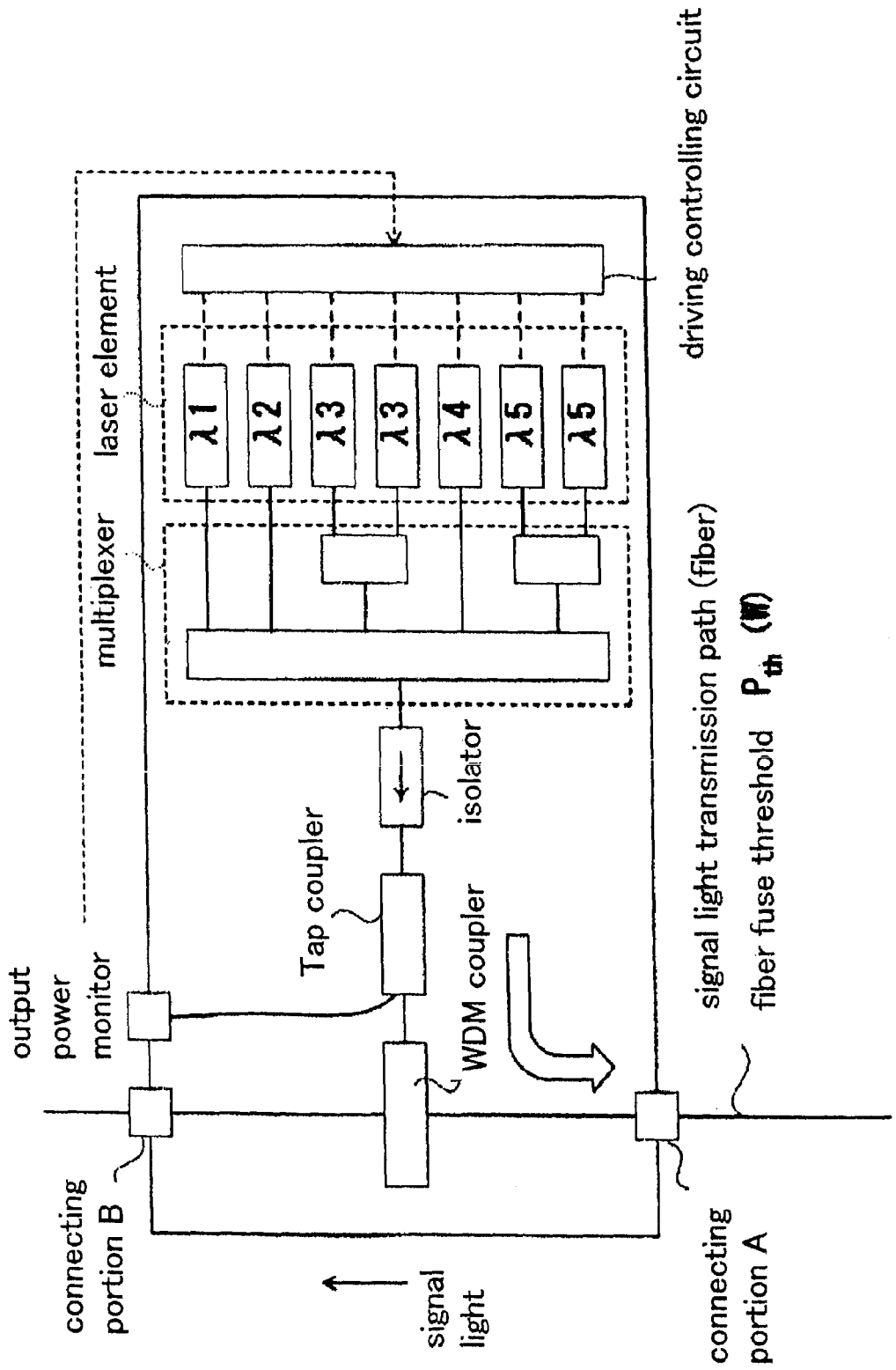
FIG. 7 is a block diagram illustrating an example of high-power wavelength division multiplexing pumping light source used in Raman amplification.

FIG. 7 shows a configuration of high-power wavelength division multiplexing pumping light source which is used for a Raman amplifier. This high-power wavelength division multiplexing pumping light source has seven laser elements of five wavelengths. These laser elements are wavelength-stabilized by a FBG, a multi layer film filter or the like. Pumping light generated from these laser elements is polarization-multiplexed or wavelength-multiplexed at a multiplexer to be high-power pumping light. This Raman amplifier allows a flat gain-wavelength characteristic by changing output power of each wavelength.

The amplifier shown in FIG. 7 utilizes a counter-pumping system which is connected to a signal light transmitting path via connecting portions A and B and the aforementioned high-power pumping light is propagated via a WDM coupler. In addition, the tap coupler at the halfway divides a very small amount of the high-power pumping light, which is then transmitted to an output power monitor. This output power monitor monitors total output power of the high power pumping light. A monitored value is fed back to a driving controlling circuit. The driving controlling circuit serves to control output of the laser elements so as to generate signal light and pumping light of a predetermined output.

Figure 8:
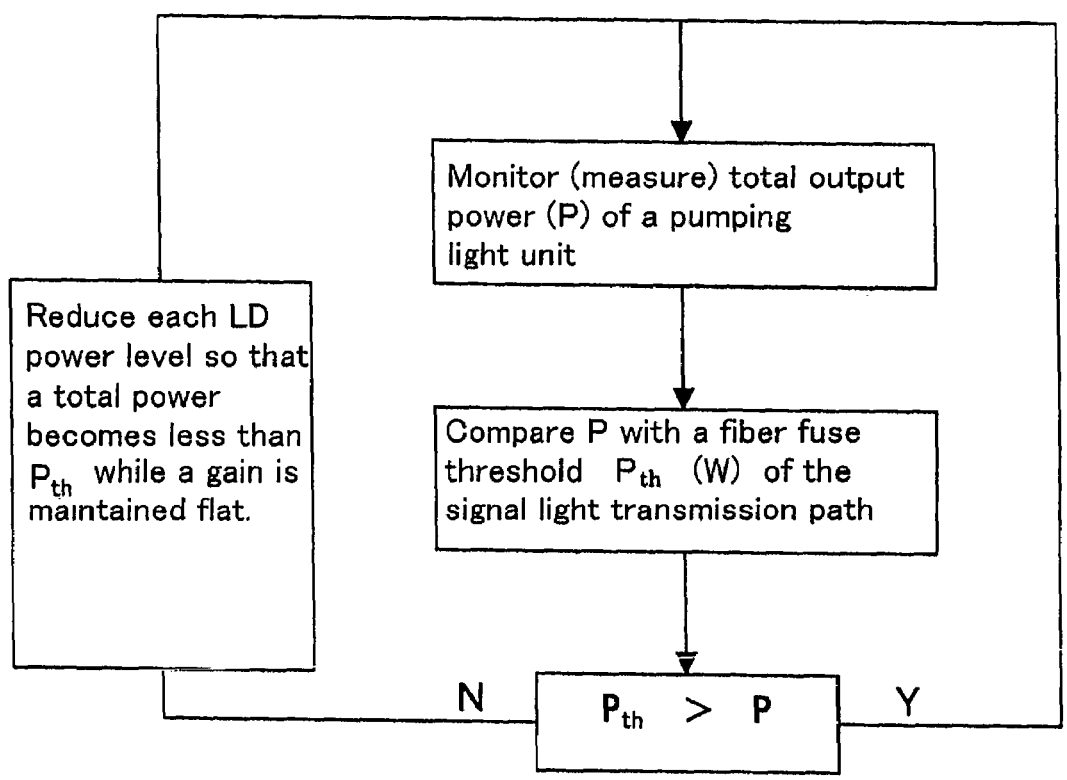
FIG. 8 is a flowchart showing a signal light transmitting method for controlling total output power P so that the total output power P may become lower than a fiber fuse propagation threshold $P_{th}$ (W)

This controlling method is shown in a flowchart of FIG. 8. As described above, total output power P of a pumping light unit is monitored. Then, this value is compared with fiber fuse propagation thresholds $P_{th}$ for preset various parameters. If the total output power P is smaller than a fiber fuse propagation threshold $P_{th}$, the power itself is maintained or increased.

When the total output power P is larger than a fiber fuse propagation threshold $P_{th}$, there may occur a fiber fuse and therefore, control is performed so as to reduce the power P. In this case, what is important is that it is necessary to reduce the power while maintaining a flat gain-wavelength characteristic.

The Raman amplifier can present a flat gain-wavelength characteristic by controlling output power of pumping light at each wavelength. However, if power of a particular wavelength is reduced when reducing total power, the flatness of the gain-wavelength characteristic is lost and it becomes difficult for the Raman amplifier to offer enough performance. Particularly, since there are likely to occur ripples in a gain spectrum obtained by short-wavelength side pumping light, generally, it is necessary to perform control to increase the number of multiplexed light so as to reduce a gain per wavelength.

Accordingly, in order not to cause ripples and not to lose the flat gain-wavelength characteristic, it is required to control power reduction appropriately so as to reduce power of pumping light of every wavelength by a small amount.

With these controls, it becomes possible to eliminate the risk to cause or propagate a fiber fuse and transmit high-power signal light and pumping light with a stable gain-wavelength characteristic.

As described above, when high-power pumping light and signal light in several Watts are to be propagated, according to the present invention, it is possible to provide an optical fiber which allows continuing of propagation without being damaged even when the optical fiber is bent with a small diameter of 10 mm. Accordingly, the present invention can respond sufficiently to a demand for high-power transmitted signal light and pumping light associated with an increase in the transmission capacity and for miniaturizing of an optical device used in the optical communication system. It is also possible to prevent troubles due to an accident or mistake.

Further, according to the present invention, it becomes possible to propagate high-power pumping light and signal light without the risk to cause or propagate a fiber fuse. Particularly, according to a transmitting system of the present invention, it is possible to control propagated pumping light and signal light without losing the flat gain-wavelength characteristic of the Raman amplifier or the like, and thereby enabling to propagate stable, high-power pumping light and signal light.

Furthermore, by utilizing an optical fiber or a transmitting system of high power pumping light or signal light according to the present invention, it becomes possible to provide various optical devices and optical communication systems ready for high power light.

(Damages to Optical Fiber End Face)

Next description is mage about damages to an optical fiber end face.

Figure 9:
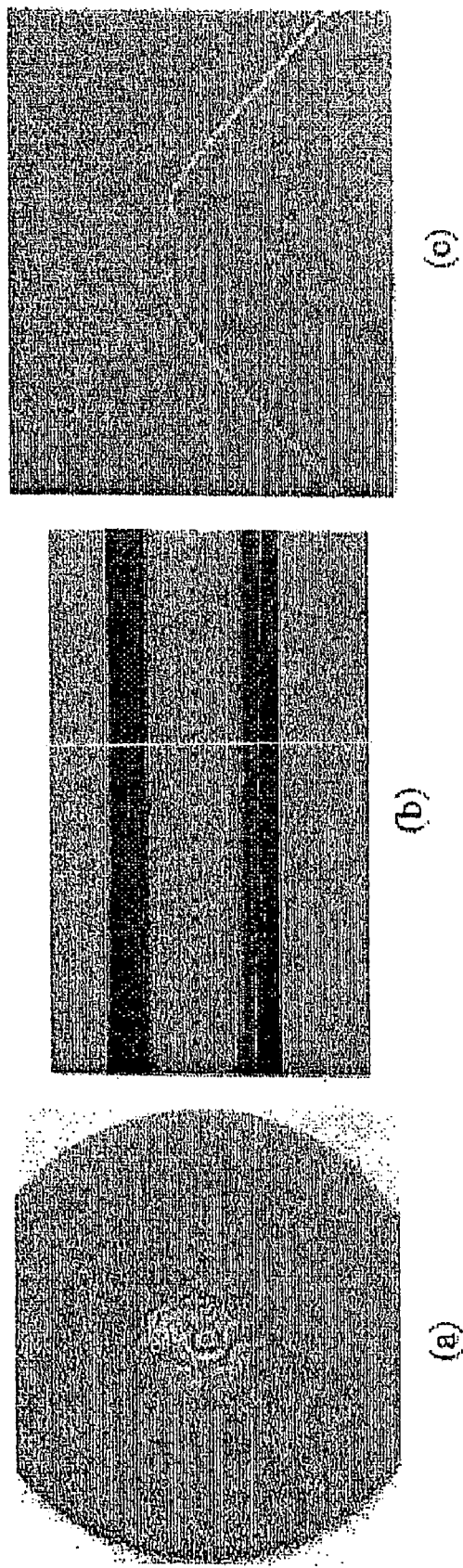
FIG. 9A is a view showing damage to a fiber end face.
FIG. 9B is a view showing damage to a fiber end face.
FIG. 9C is a view showing damage to a fiber end face.

As the optical power increases, the optical fiber end face is sometimes damaged as shown in FIGS. 9A through 9C. In fact, damage to an optical connector has been reported.

Then, an experiment was performed using a light source having a peak wavelength at 1480 nm which was in the same waveband as that of the pumping light of an optical amplifier. Experimental samples were prepared by scratching an end face of an FC connector or coupling connectors with contamination applied therebetween. Then, laser light of 2 W was input to the optical system and change in the experimental sample was observed. These experimental conditions and experimental results are shown in FIG. 10.

As shown in the experimental results, in the case of the experimental sample in normal (a commercially available SMF with no scratch added to the core thereof), there was no change as expected.

Next, also in the case of the experimental sample with scratches by polishing on the not very appropriate condition, there were any other scratches found. In the case of the experimental sample with very large scratches by 5 μm file, the temperature increased however any other scratches were not found. In the case of the experimental sample with contaminants of high transparency, no change was found. In the case of the experimental sample with index-matching oil, the temperature increased, however, this is because of connection loss.

In the case of the experimental sample with contaminants absorbing optical power of a black component or metal, even if the connection loss is small, the end face of the experimental sample was damaged and sometimes fiber fuse occurred.

Particularly, in the case of phosphor bronze, the end face was damaged by only output of 50 mW.

As is seen from the experiment described above, the optical fiber end face is damaged directly only by contaminants that absorb optical power easily. Hence, as the contaminants may be captured by damages on the core, preferably the core layer is prevented from being damaged. Likewise, as bubble and contaminants are easy to be captured, use of index-matching oil is preferably avoided in the high power environment.

Here, when an MFD is broadened with use of GRIN lens or heat dissipation technique, energy output density at an end can be reduced, which presents an effect of improved endurance. On the other hand, the most effective way for solving the problem is to clean the end face in order to remove contaminants. If the end is broken, a damaged connecter may be polished again or exchanged with another to solve the problem.

Up to this point, the various embodiments of the present invention have been described. However, the present invention is not limited to these embodiments and may be implemented by any other various embodiments.

What is claimed is:

1. A light transmitting method comprising the step of:
    obtaining a fiber fuse propagation threshold which is a minimal light output required for fiber fuse propagation by the following linear expression: $P_{th}=0.15 \cdot D$ wherein $P_{th}$ is a fiber fuse propagation threshold (W) and D is MFD of the optical fiber (μm); and
    controlling a transmitted light output so that the transmitted light output becomes smaller than the fiber fuse propagation threshold (W).

2. An optical amplifier controlling method comprising the steps of:
    monitoring a branched small amount of output light from an optical amplifier;
    comparing a monitored value with a preset fiber fuse propagation threshold;
    and when the monitored value is smaller than the fiber fuse propagation threshold, providing instructions to maintain or increase the output light of the optical amplifier and when the monitored value is equal to or larger than the fiber fuse propagation threshold, providing instructions to reduce the output light of the optical amplifier, wherein a fiber fuse propagation threshold $P_{th}$ which is a minimal light output required for fiber fuse propagation is obtain by the following linear expression: $P_{th}=0.15 \cdot D$ wherein $P_{th}$ is fiber fuse propagation threshold (W) and D is MFD of the optical fiber (μm).

3. The optical amplifier controlling method as claimed in claim 2, wherein reducing of the output light of the optical amplifier is performed by reducing a light output of every wavelength of wavelength-division-multiplexed light by a small amount.

4. A light transmitting method as claimed in claim 1, wherein the linear expression is applied when 10 μm $\leq$ D.

5. The optical amplifier controlling method as claimed in claim 2, wherein the liner expression is applied when 10 μm $\leq$ D.

* * * * *